Dec. 22, 1936.                B. A. DIGGINS                2,065,122
                                 GOGGLES
                            Filed June 1, 1936
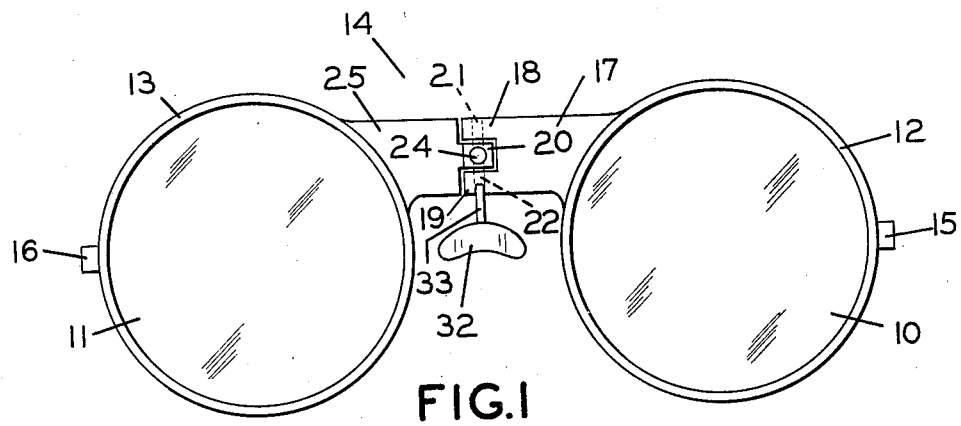
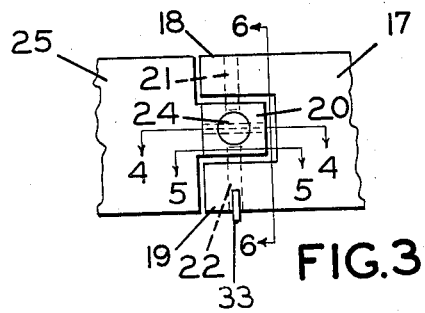
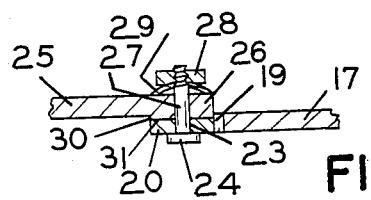
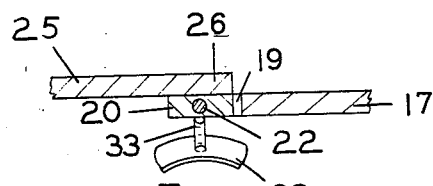
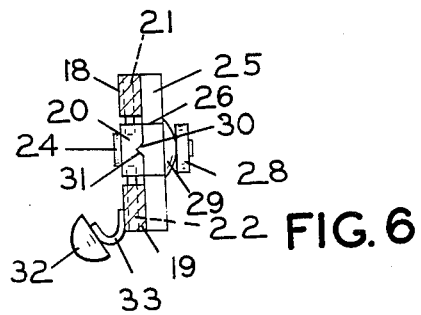
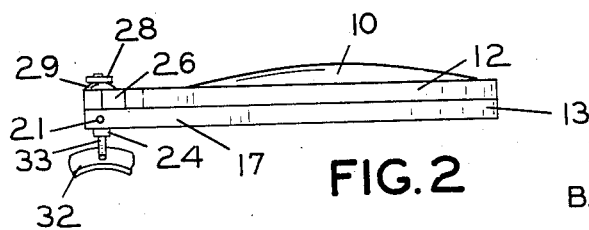
BARTHOLOMEW A. DIGGINS
        INVENTOR
BY  *J. A. Ellestad*
       ATTORNEY Patented Dec. 22, 1936

2,065,122

UNITED STATES PATENT OFFICE 2,065,122

GOGGLES

Bartholomew A. Diggins, Rochester, N. Y., assignor to Bausch & Lomb Optical Company, Rochester, N. Y., a corporation of New York Application June 1, 1936, Serial No. 82,796

6 Claims. (Cl. 88—44)

The present invention relates to goggles or the like and more particularly to folding goggles.

Goggles of the type worn by aviators and automoblists are frequently provided with highly curved lenses. When such goggles are not in use, it is desirable that they be as compact as possible so that they may be conveniently carried in the pocket or other small space. Heretofore, this problem has been attacked by placing a pivot in the bridge and folding the goggles about this pivot so that the concave surfaces of the lenses face each other. It can be readily seen that if the lenses are highly curved, the structure described will result in a package of considerable thickness.

One of the objects of the present invention is to provide a pair of goggles which can be compactly folded. Another object is to provide a pair of goggles having bridge members pivotally connected for movement about two intersecting axes. Another object is to provide an improved folding bridge for goggles. A further object is to provide a pair of goggles which can be folded so that the curvatures of the lenses are parallel. These and other objects and advantages reside in certain novel features of construction, arrangement and combination of parts as will hereinafter be more fully set forth and pointed out in the appended claims.

Referring to the drawing:

Fig. 1 is a rear view of a pair of goggles embodying this invention.

Fig. 2 is a top view of same in folded position.

Fig. 3 is an enlarged rear view of the bridge.

Fig. 4 is a section taken on line 4—4 of Fig. 3.

Fig. 5 is a section taken on line 5—5 of Fig. 3.

Fig. 6 is a section taken on line 6—6 of Fig. 3.

One embodiment of the present invention is illustrated in the drawing wherein the goggle lenses 10 and 11 are mounted in lens mounts or rims 12 and 13, respectively, attached together by means of a bridge indicated generally at 14. The usual endpieces or temple connections are provided as at 15 and 16.

Secured to the lens mount or rim 12 is a bridge member 17 bifurcated at its outer end to provide the two arms 18 and 19. A block 20 is pivotally secured to the bridge member 17 by pins 21 and 22 which extend through the arms 18 and 19, respectively, and are fixed in the block 20. The block 20 is apertured at 23 and a pin 24 extends through this aperture.

A second bridge member 25 is secured to the lens mount or rim 13 and is provided with a reduced end portion 26 which is smaller than the distance between the arms 18 and 19. An aperture 27 is formed in the reduced portion 26 to receive the pin 24 and the reduced portion 26 of the bridge member 25 is secured on the pin 24 by means of a nut 28 as shown especially in Fig. 4.

A spring 29 between the nut 28 and the reduced portion 26 serves to urge the reduced portion 26 into frictional contact with the block 20 so that while the bridge member 25 may be pivoted about the pin 24, it will tend to remain in a fixed position. A suitable fixed position may be predetermined by forming a tongue 30 on the reduced portion 26 and a cooperating groove 31 on the block 20 as shown in Fig. 6. A suitable nose engaging member 32 is secured to the arm 19 by a bracket 33 on the side opposite the reduced end portion 26 of the bridge member 25. In this way the nose engaging member 32 does not interfere with the pivoting of the bridge member 25 about the pin 24.

In use, the two bridge members 17 and 25 can pivot about the pins 21 and 22 and thus conform to the face of the wearer. When the goggles are not in use, the bridge members 17 and 25 are pivoted about the pin 24 so as to fold into the position shown in Fig. 2.

From the foregoing, it will be apparent that I am able to attain the objects of my invention and provide a pair of goggles which can be compactly folded. Various modifications can, of course, be made without departing from the spirit of my invention or the scope of the appended claims.

I claim:

1. A device of the character described comprising a lens mount, a bridge member secured to said lens mount, said bridge member being bifurcated at its outer end, a block pivotally mounted between the bifurcations, a pin extending through said block perpendicular to its pivotal axis, a second bridge member pivotally mounted on said pin, cooperating positioning means on the block and on the second bridge member, means for urging the positioning means into engaging relation, and a second lens mount secured to the second bridge member.

2. A device of the character described comprising a lens mount, a bridge member secured to said lens mount, a block pivotally secured to said bridge member, a second bridge member pivotally secured to said block for pivotal movement about an axis perpendicular to the pivotal axis of the block and a second lens mount secured to said second bridge member.

3. A device of the character described comprising a lens mount, a bridge member secured to said lens mount, said bridge member being bifurcated at its outer end, a block pivotally mounted between the bifurcations, a pin extending through said block perpendicular to its pivotal axis, a second bridge member pivotally mounted on said pin, means for urging said second bridge member into engagement with said block, and a second lens mount secured on said second bridge member.

4. In a pair of goggles a bridge member, a block pivotally mounted on said bridge member, a second bridge member pivotally secured to said block for pivotal movement about an axis perpendicular to the pivotal axis of the block, and means for pivoting the second bridge member about its axis between an operative and an inoperative position.

5. In a pair of goggles a bridge member, a block pivotally mounted on said bridge member, a second bridge member pivotally secured to said block for pivotal movement about an axis perpendicular to the pivotal axis of the block, means for pivoting the second bridge member about its axis between an operative and an inoperative position, and means for locking said second bridge member in either of said positions.

6. In a pair of goggles a bridge member, a block pivotally mounted on said bridge member, a second bridge member pivotally secured to said block for pivotal movement about an axis perpendicular to the pivotal axis of the block, means for pivoting the second bridge member about its axis between an operative and an inoperative position and cooperating tongue and groove means on said second bridge member and on said block for locking said second bridge member in either of said positions.

BARTHOLOMEW A. DIGGINS.